Feb. 17, 1948.  M. A. DEMING  2,436,206
SELF-SEALING COUPLING
Filed Dec. 6, 1945

Inventor
MARK A. DEMING
By Beaman & Patch
Attorneys

Patented Feb. 17, 1948

2,436,206

UNITED STATES PATENT OFFICE 2,436,206

SELF-SEALING COUPLING

Mark A. Deming, Jackson, Mich., assignor, by mesne assignments, to Aeroquip Corporation, Jackson, Mich., a corporation of Michigan Application December 6, 1945, Serial No. 633,188

14 Claims. (Cl. 284—19)

The present invention relates to couplings for tubular conductors and more particularly to couplings which may be made and broken without changing the volume of the liquid contained within the coupling.

The principal object of the invention is to provide an improved coupling of the kind above referred to which incorporates a liquid compensating chamber which permits a transfer flow of the liquid within the coupling to take place incident to the connection and disconnection of the coupling.

Another object of the present invention is to provide a fixed-length, self-sealing coupling.

Yet another object of the invention is to provide a fixed-length, self-sealing coupling, having an annular carriage and an annular track, with a fluid seal between the parts.

Figure 1:
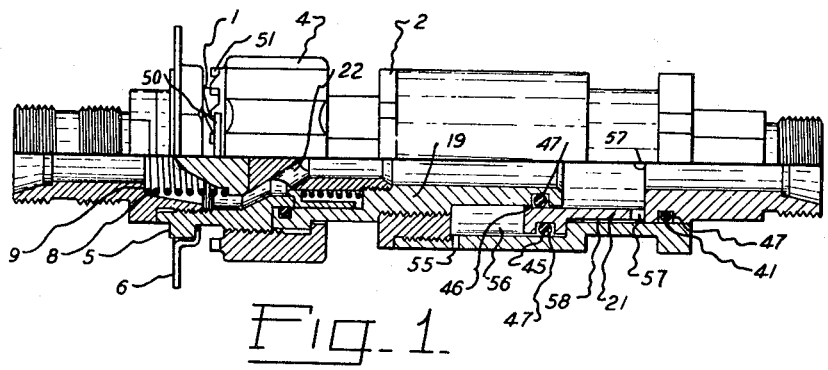
Figure 2:
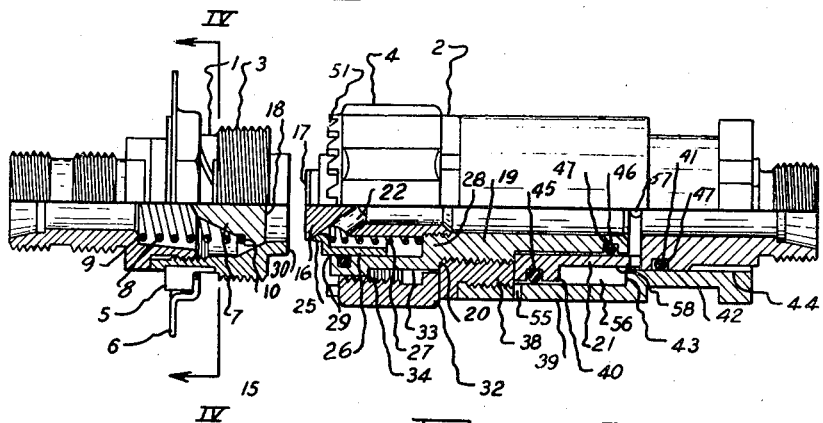
Figures 3, 4:
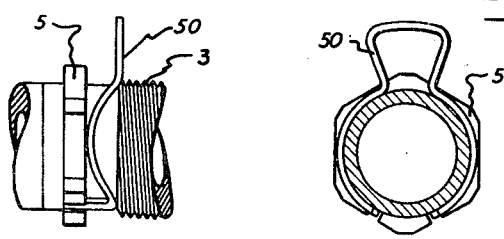

These and other objects regarding the arrangement, combination and construction of the parts will be apparent from the following specification, when taken with the accompanying drawings, in which Fig. 1 is an elevation, partly in section, of one form of the invention, showing the parts of the coupling coupled together, Fig. 2 is a view similar to Fig. 1, showing the parts of the coupling separated, Fig. 3 is a partial elevation of a portion of the invention showing a locking detail, and Fig. 4 is a partial section of the line IV—IV of Fig. 2.

Referring particularly to Fig. 2 of the drawing, reference character 1 indicates a male portion 1 of a coupling according to the present invention, which is adapted to be connected to a female portion 2. The male portion 1 has a multiple-threaded portion 3 upon which a nut 4 slidably retained upon the part 2 is adapted to be screwed. It is to be understood that the multiple-threaded portion 3 has several parallel threads so as to permit rapid coupling of the nut 4 upon the screw-threaded portion 3. The male portion 1 has as a part thereof, a hexagonal portion 5 about which there is secured a sheet metal cap 6 by means of which the coupling portion can be screwed to a bulkhead or other structure.

Arranged within the coupling portion 1 is a valve 7 supported by a helical spring 8, bearing at one end against a shoulder 9 in the portion 1 and at the other end against a shoulder 10 on the valve 7. The spring 8 urges the valve 7 into sealing relation with the valve seat 15 when the coupling parts 1 and 2 are disconnected as shown in Fig. 2.

The coupling part 2 is provided interiorly with a rigidly mounted valve seat 16, having an abutment surface 17 for engagement with the face 18 of the valve 7, as will be hereinafter described. The valve seat 16 is provided upon a tubular part which is threaded into a sleeve 19 which is a part of a carriage 20, slidable axially on an annular track 21. The valve seat 16 is provided with a plurality of ports, 22, for providing passage past the valve seat 16 during times when the coupling is closed as shown in Fig. 1.

The passage of liquid through the ports 22, of which there are as many as necessary to provide adequate passage of liquid through the coupling, is sealed off by a valve 25 supported by a sleeve 26 and resiliently urged against the valve seat 16 by a helical spring 27, one end of which bears against a shoulder 28 on the tubular carriage portion 19. The valve 25 is provided with a shoulder 29 for engaging with an annular boss 30 projecting from the male coupling portion 1 as will be hereinafter described.

The carriage 20 carries a coupling nut 32 which is slidable along a cylindrical section 33 until it is abreast with a shoulder 34 during coupling action. Also, a part of carriage 20 has an annular member 38 which is threaded to the sleeve 19, and has threaded to it a second sleeve 39. The sleeve 39 slides telescopically over an annular boss 40 projected radially outwardly from the end of the annular track 21.

The sleeve 39 has a radially inwardly extended boss 42 providing a shoulder 43 and a cylindrical surface 44 for sliding against the outside of the track 21. The sleeve 19 of the carriage 20 slides on the inside of the annular track 21. In order to provide a seal against the escape of liquid between sleeve 19 and track 21, the track 21 is provided with an annular channel 41 in the body thereof and annular channel 45 in boss 40 and the carriage 20 is provided with an annular channel 46 in sleeve 19 thereof. The annular channels 41, 45 and 46 have arranged therein, sealing rings 47 of the "O" type, which preferably are of synthetic rubber or the like and are subject to being flexed under liquid pressure so as to increase the effectiveness of the seal they provide.

The male coupling portion 1 is provided with a locking wire 50 arranged to cooperate with locking teeth 51 on the coupling nut 4. However, this locking feature is not a specific feature of the present invention.

The track 21 is of sleeve formation and has an intermediate portion 21a, which has a piston fit in the boss 42, and an end portion 21b which has a piston fit in the sleeve 39. These two piston portions of the track 21 are joined by an integral sleeve portion 21c which has a substantial clearance fit with respect to the boss 42 and contains a series of circumferentially spaced ports 57 through which liquid from within the coupling part 2 may flow into the annular clearance space 58 formed between the sleeve portion 21c of the track and the boss 42, which clearance space has free communication with the annular cavity 56 as and when the carriage 20 is moved from the position shown in Fig. 1 to the position shown in Fig. 2. As stated, the piston part 21b of the track 21 operates within the boss 39 and whereas this movement is rendered relatively easy by the displacement of liquid from the interior of the coupling part 2 into the annular cavity 56, via the ports 57 and the annular clearance space 58, this movement of the carriage is further facilitated by the provision of a series of circumferentially spaced air-bleed ports 55 which are effective as to the air space formed in the annular cavity 56 behind the piston portion 21b of the track 21 and sealed from the liquid in this cavity, on the opposite side of the said piston portion, by the sealing ring 47 carried by the latter.

The operation of the invention is as follows:

The carriage 20 is moved laterally to the left as viewed in Fig. 2 when it is desired to close the coupling. The abutment portion 17 of the valve seat 16 moves into engagement with the valve 7 to cause it to move away from the valve seat 15 to the position shown in Fig. 1, to permit the passage of fluid thereby. At the same time the annular boss 30 of the male coupling portion 1 engages with the shoulder 29 of the valve 25 to cause the same to move relatively to the right as viewed in Fig. 1, pressing the spring 27 and opening the ports 22 to the flow of liquid therethrough. It will thus be seen as viewed in Fig. 1 that there is established an unobstructed passageway through the coupling. As the carriage 20 moves to the left as viewed in Fig. 2, the sleeves 19 and 39 thereof slide on the annular track 21, a sealing between them being maintained by sealing rings 47 in the annular slots 44, 45 and 46. Movement of the carriage 20 to the left as viewed in Fig. 1 is limited by the annular boss 40 bearing against the shoulder 43 of the sleeve 39. The movement of the carriage 20 relatively to the track 21 is facilitated by the provision of the air-bleed ports 55 the interior of the annular cavity 56 as formed by the ring 38, and also by the ports 57, annular clearance space 58 and annular cavity 56, which latter forms a liquid displacement chamber into which liquid may be displaced from inside the coupling part 2 when the carriage is pushed back relatively to the track from the position shown in Fig. 1 to the position shown in Fig. 2. The free volume of the cavity 56 should be of substantially the same cubage as the decrease in volume of the interior of the connector portion 2 upon movement of the carriage 20 from its position of Fig. 1 to its position in Fig. 2. Also, the effective cross-sectional area of the sleeve 19 subject to fluid pressure stress toward the left as viewed in the drawing should be the same as the effective cross-sectional area of the cavity 56 subject to fluid pressure stress tending to move the sleeve 39 to the left, to balance pressures. Thus, when the coupling is opened in a line under pressure, it will not be necessary to move the carriage 20 against the fluid under pressure in the line.

When the portions 1 and 2 of the coupling have been moved together, it will be understood that the coupling nut 4 is threaded onto the multiple threaded portion 3 to hold the portions together. When the coupling nut 4 is threaded onto the threaded portion 3, the teeth 51 thereof engage with the locking spring lock wire 50 to prevent a backward rotation of the coupling nut 4. When it is desired to release the coupling nut 4, i. e., move it in a counter-clockwise direction for uncoupling the joint provided by the coupling according to the present invention, it is merely necessary to force the lock wire 50 to the left as viewed in Figs. 1, 2 and 3 of the drawing.

The foregoing description has set forth one form which the invention may take. However, it is contemplated that the invention is subject to assuming other forms and accordingly it is not desired that I be limited except by the scope of the following claims.

Having thus described my invention, what I desire to secure by Letters Patent and claim is:

1. A coupling of the character described, comprising two portions adapted to be connected together, each of said portions having connecting means for joining them together, one of said portions having an annular carriage for supporting its connecting means, an annular track for supporting said carriage for telescopic movement thereon and sealing means between said track and carriage to prevent the escape of fluid therebetween.

2. A coupling of the character described, comprising an annular track and a radially extending annular boss on said track, said boss defining a pair of axially spaced shoulders, an annular carriage telescoping with said track, an annular cavity provided by said carriage into which said annular boss extends, said boss moving in said annular cavity as said track and carriage are telescopically moved relatively to each other, said cavity having shoulders at the opposite ends thereof for engagement with said shoulders on said annular boss to determine the extent of relative movement between said track and said carriage in each axial direction, and sealing means between said carriage and said track.

3. A tubular coupling of the character described, comprising two portions adapted to be connected together, said portions having connecting means for joining them together, one of said portions having an annular carriage for supporting its connecting means, an annular track for said carriage, a radially extending annular boss on said track, said boss defining a pair of axially spaced shoulders, said track telescoping with said carriage, an annular cavity provided by said carriage, into which said annular boss extends, said boss moving into said annular cavity, as said track and carriage are telescopically moved relatively to each other, said cavity having shoulders in the opposite ends thereof for engagement with said shoulders and said annular boss to determine the extent of relative movement between said track and said carriage in each axial direction, and sealing means between said carriage and said track.

4. The invention as defined in claim 3, wherein the annular cavity is formed by two concentric, radially spaced sleeves.

5. A tubular coupling of the character described, comprising two portions adapted to be connected together, said portions having connecting means for joining them together, one of said portions having an annular carriage member for supporting its connecting means, an annular track member for supporting said carriage member for telescopic movement thereon, one of said members defining an axially opening and extending cavity, into which the other of said members extends, means for limiting the relative axial movement of said members, and sealing means between said members to prevent the escape of fluid therebetween.

6. The invention as defined in claim 5, wherein at least one of said members is provided with ports for the purpose of permitting the escape of fluid trapped in said cavity during the relative movement of said members.

7. The invention as defined in claim 3, wherein the track is provided with port means adjacent one end thereof communicating with the said cavity, for facilitating the relative axial movement of the track and carriage.

8. The invention as defined in claim 5, wherein the carriage member and the track member have surfaces in sliding contact with each other and wherein there are provided for each pair of sliding contacting surfaces a recessed sealing ring in one of the surfaces sliding against the other of said surfaces for sealing against the passage of fluids between the respective surfaces.

9. A tubular coupling of the character described, comprising two portions adapted to be connected together, the portions having connecting means for joining them together, one of said portions having an annular carriage for supporting its connecting means, said carriage having a sleeve portion, a second sleeve portion threaded to said first sleeve portion and arranged in concentric and spaced relation to the first sleeve portion, an annular track having a portion projecting telescopically between said sleeve portions, means for limiting relative telescopic movement between said sleeve portions and said track, and means providing a seal between said sleeve portions and said track to prevent the escape of fluid therebetween.

10. A tubular coupling of the character described, comprising two portions adapted to be connected together, said portions having connecting means for joining them together, one of said portions having a carriage for supporting its connecting means, said carriage having a sleeve, a ring threaded about one end of said sleeve, a second sleeve threaded about said ring, said sleeves being radially spaced apart by said ring to provide a cavity therebetween, an annular track for said carriage, said track extending into said cavity in a telescopic relation therewith, means to limit the telescopic movement of said track in said cavity and means to provide a seal between said sleeves and said track for preventing the escape of fluid therebetween.

11. The invention as defined in claim 10, wherein the track has at its outer end a radially outwardly extending annular boss, said boss defining axially spaced shoulders and wherein the second-named sleeve is provided with a radially inwardly extending annular shoulder, defining one end of the cavity, the threaded ring defining the other end of the cavity, whereby the shoulders of the boss connect with the last-named annular shoulder and the ring to limit the relative telescopic movement of the track with respect to the carriage, and a sealing means between the track and the carriage prevents the escape of fluid therebetween.

12. The invention as defined in claim 10, wherein the track has at its outer end a radially outwardly extending annular boss, said boss defining axially spaced shoulders and wherein the second-named sleeve is provided with a radially inwardly extending annular shoulder, defining one end of the cavity, the threaded ring defining the other end of the cavity, whereby the shoulders of the boss connect with the last-named annular shoulder and the ring to limit the relative telescopic movement of the track with respect to the carriage, and sealing means comprising a sealing ring recessed in the outer surface of the boss, providing a seal between the boss and the second-named sleeve, a recessed sealing ring in the first sleeve, providing a seal between the first sleeve and the track, and a recessed sealing ring in the track, providing a seal between the track and the second-named sleeve.

13. In a coupling of the kind comprising a pair of body parts having valves which close to seal their respective body parts when the latter are disconnected, means providing for displacement of liquid incident to the coupling and uncoupling operations comprising a sleeve on one said body part telescopically mounted with respect to said body part and forming therewith an enclosed annular liquid compensating chamber, and passage means between said chamber and the one said body part providing for a free transfer flow of part of the liquid to take place between the chamber and body part, whereby to provide a compensation effect for said liquid displacement.

14. A tubular coupling of the kind comprising a pair of body parts having valves which close to seal their respective body parts when the latter are disconnected, and having means for connecting said body parts together or for disconnecting them, said valves being opened when the body parts are connected so as to provide a common liquid conduit through the connected body parts, an annular carriage incorporated in one said body part, an annular track incorporated also in the latter and mounted about said carriage, said carriage and track forming a longitudinally extending annular liquid compensating chamber between them, the carriage having port means open to said chamber and to the interior of the carriage to provide for a transfer flow of liquid to take place between the carriage and the compensating chamber, a radially extending annular boss on said track having a piston fit in said chamber, said track and carriage having a telescopic connection with one another and said boss moving longitudinally of said chamber as the carriage and track are telescopically moved relatively to each other and stop means in said chamber for limiting the sliding movement of said boss therein.

MARK A. DEMING.

REFERENCES CITED

The following references are of record in the file of this patent:

UNITED STATES PATENTS

| Number | Name | Date |
|---|---|---|
| 2,391,022 | Main | Dec. 18, 1945 |